United States Patent
Graefe et al.

(10) Patent No.: US 8,892,612 B2
(45) Date of Patent: Nov. 18, 2014

(54) EXPLOITATION OF CORRELATION BETWEEN ORIGINAL AND DESIRED DATA SEQUENCES DURING RUN GENERATION

(75) Inventors: Goetz Graefe, Madison, WI (US); Harumi Kuno, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 590 days.

(21) Appl. No.: 13/075,570

(22) Filed: Mar. 30, 2011

(65) Prior Publication Data
US 2012/0254171 A1    Oct. 4, 2012

(51) Int. Cl.
*G06F 17/30*    (2006.01)
(52) U.S. Cl.
CPC ....................................... *G06F 17/30* (2013.01)
USPC ........... 707/822; 707/604; 707/610; 707/791; 707/802; 707/828
(58) Field of Classification Search
USPC ......... 707/604, 610, 791, 661, 802, 822, 828, 707/960
See application file for complete search history.

(56) References Cited

U.S. PATENT DOCUMENTS

| | | | |
|---|---|---|---|
| 4,210,961 A | | 7/1980 | Whitlow et al. |
| 4,295,206 A | * | 10/1981 | Cain et al. ............................. 1/1 |
| 4,414,629 A | | 11/1983 | Waite |
| 5,142,687 A | | 8/1992 | Lary |
| 6,408,314 B1 | | 6/2002 | Liu |
| 6,434,560 B1 | | 8/2002 | Case |
| 7,260,558 B1 | | 8/2007 | Cheng et al. |
| 7,707,287 B2 | * | 4/2010 | Shafir et al. ................... 709/225 |
| 2003/0182423 A1 | * | 9/2003 | Shafir et al. ................... 709/225 |
| 2008/0104076 A1 | * | 5/2008 | Carroll ............................. 707/7 |
| 2010/0191749 A1 | | 7/2010 | Liu |

OTHER PUBLICATIONS

Goetz Graefe, "Implementing Sorting in Database Systems", ACM Computing Surveys, Sep. 2006, vol. 38, No. 3, Article 10.

* cited by examiner

*Primary Examiner* — Sana Al Hashemi

(57) ABSTRACT

A computer executed method of exploiting correlations between original and desired data sequences during run generation comprises, with a processor, adding a number of data values from a data source to a first memory device, the first memory device defining a workspace, determining whether the data values within the workspace should be output in ascending or descending order for a number of runs, and writing a number of the data values as a run to a second memory device in the determined order.

16 Claims, 2 Drawing Sheets

EXPLOITATION OF CORRELATION BETWEEN ORIGINAL AND DESIRED DATA SEQUENCES DURING RUN GENERATION

BACKGROUND

Sorting of data has become an important part of computing due to the increased use of computers and correlating increase in the volume and complexity of the data to be sorted. Developments in sorting of data in a more accurate, efficient, and rapid manner has also become increasingly important. Sorting frequently comprises two major actions: generation of a number of runs and merging of those runs. Run generation is a process of accepting unordered data, partially ordered data, or data of which the order is unknown, and forming this data into groups of ordered or sequenced data. The data is often sorted in numerical order or lexicographical order, although other orders may be used. Merging is a process of combining the generated runs into larger runs until one run or one set of ordered data remains. With the large volumes of data compiled in storage devices, and accessed by computing devices throughout the world, it is often difficult to ensure that the sorting of these large volumes of data takes as little time as possible to complete, and consumes as few computing resources as possible.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
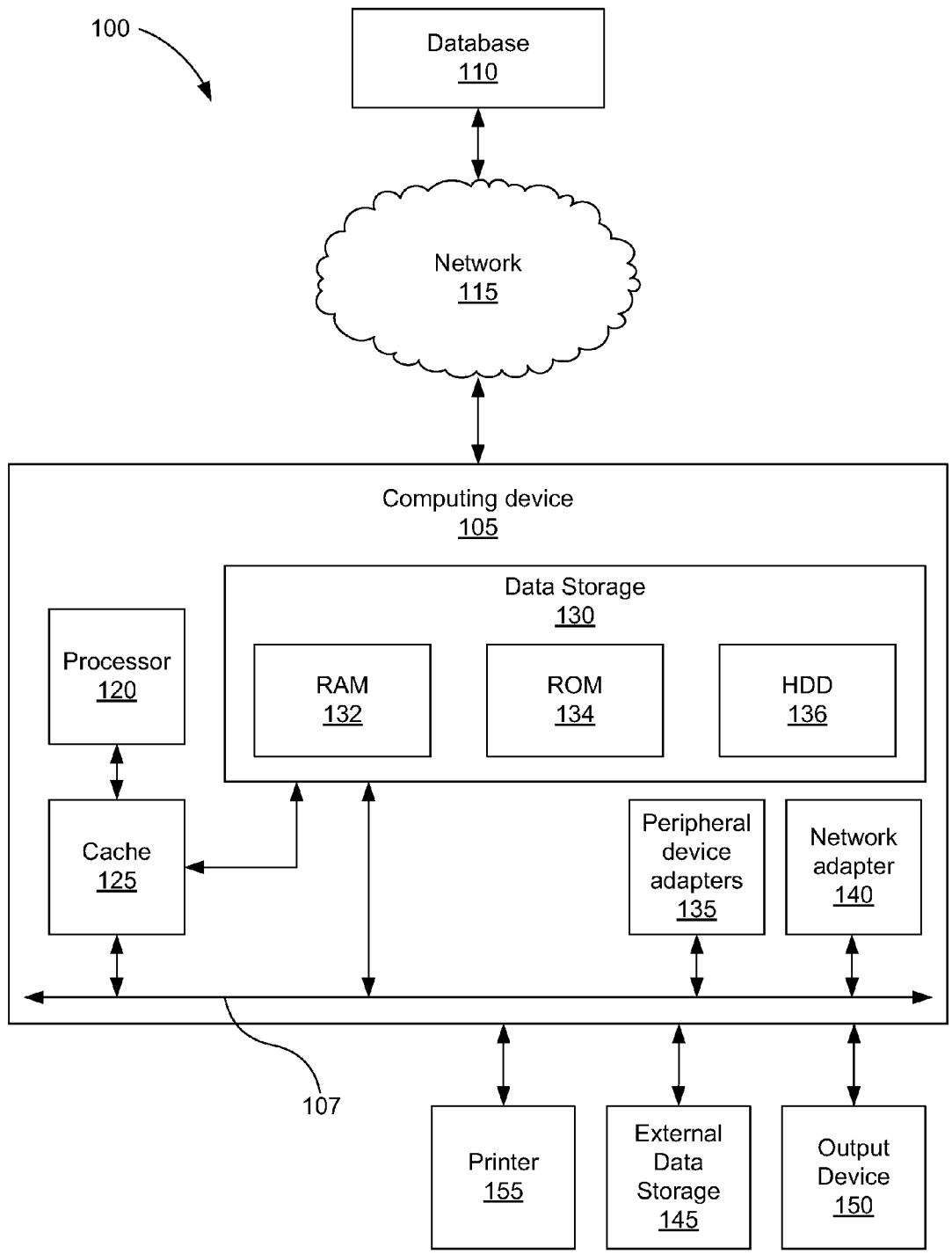
FIG. 1 is a diagram of an illustrative system for exploiting incidental sort order during run generation, according to one example of the principles described herein.

During the generation of sorted runs from a data source, switching dynamically between ascending and descending sort order can exploit a negative as well as positive correlation between input sort order and desired output sort order. When sorting a number of records or other data into a sorted order, the time and cost, for example, in computing power and resources, is reduced by exploiting any correlation between the sort order of the input records or data and the desired sort order. In one example, a positive correlation can be exploited by generation of runs through replacement selection, the result being very long and, therefore, fewer runs. However, a negative correlation is not exploited by any known methods, and, in most cases, results in shorter, and, therefore, more numerous, runs that cost more in terms of time and computer resources.

Sorting using reversal of run order and truncation of runs may comprise two parts. First, a detrimental correlation is detected in the data that are input. Second, a switch to an ascending or descending sort during run generation in order to exploit a negative correlation is performed if such an adjustment would be advantageous.

For truly random input data, run generation by replacement selection produces runs approximately twice as large as the workspace allocated to the priority queue. The exception is the first run, which may be expected to be approximately 1.5 times as large as the workspace. If a negative correlation exists between the order of the input keys and sort order of the run generation process then runs will be smaller than 1.5 times workspace size. In that case, run generation logic should switch from ascending to descending (or vice versa).

In the following description, for purposes of explanation, numerous specific details are set forth in order to provide a thorough understanding of the present systems and methods. It will be apparent, however, to one skilled in the art that the present apparatus, systems, and methods may be practiced without these specific details As used in the present specification and in the appended claims, the term "data" is meant to be understood broadly as a representation of facts or instructions in a form suitable for communication, interpretation, or processing by a computing device and it associated data processing unit. Data may comprise, for example, constants, variables, arrays, and character strings. In connection with the above, as used in the present specification and in the appended claims, the terms "record" or "records" are meant to be understood broadly as a group of related data, words, or fields treated as a unit, such as one name, address, and telephone number.

Further, as used in the present specification and in the appended claims, the term "sort" is meant to be understood broadly as rearranging some or all of a group of records or data, based upon the contents or characteristics of those records. Various methods of sorting may be employed and include, for example, replacement selection, a merge sort, a bubble sort, a selection sort, an insertion sort, a shell sort, a comb sort, a heapsort, a quicksort, a counting sort, a bucket sort, a radix sort, a distribution sort, a timsort, or combinations thereof.

Further, as used in the present specification and in the appended claims, the terms "ascending," "ascending sort order," or similar language is meant to be understood broadly as correlation with a desired sort order, whereas the terms, "descending," "descending sort order," or similar language is meant to be understood broadly as a sort order that is opposite to a desired sort order.

Still further, as used in the present specification and in the appended claims, the term "cost" is meant to be understood broadly as the estimated total resource usage within a computing device that brings about the end result of instructions or commands given to the computing device. In one example, cost is derived from a combination of processor cost (in number of instructions) and I/O cost (in numbers of seeks and page transfers). The cost of a particular set of computer instructions or commands used as a weighting mechanism to differentiate one set of computer instructions or commands from another set of computer instructions or commands where a smaller value is always preferred to improve computation time and computer resource allocation.

Referring now to FIG. 1, an illustrative system (100) for exploiting incidental sort order during run generation may include a computing device (105) that has access to a database (110). In the present example, for the purposes of simplicity in illustration, the computing device (105) and the database (110) are separate computing devices communicatively coupled to each other through a network (115). However, the principles set forth in the present specification extend equally to any alternative configuration in which a computing device (105) has complete access to a database (110). As such, alternative examples within the scope of the principles of the present specification include, but are not limited to, examples in which the computing device (105) and the database (110)

are implemented by the same computing device, examples in which the functionality of the computing device (105) is implemented by multiple interconnected computers, for example, a server in a data center and a user's client machine, examples in which the computing device (105) and the database (110) communicate directly through a bus without intermediary network devices, and examples in which the computing device (105) has a stored local copy of the database (110) that is to be analyzed.

The computing device (105) of the present example retrieves data or records from a data source such as, for example, the database (110), and generates sorted runs from the retrieved data based, at least partially, on an incidental sort order of the data as it is stored within the database (110). In the present example, this is accomplished by the computing device (105) requesting the data or records contained within the database (110) over the network (115) using the appropriate network protocol, for example, Internet Protocol ("IP"). In another example, the computing device (105) requests data or records contained within other data storage devices such as, for example, data storage (130) and external data storage (145). Illustrative processes for exploiting incidental sort order during run generation are set forth in more detail below.

To achieve its desired functionality, the computing device (105) includes various hardware components. Among these hardware components may be at least one processor (120), at least one cache memory (125), at least one data storage device (130), peripheral device adapters (135), and a network adapter (140). These hardware components may be interconnected through the use of one or more busses and/or network connections. In one example, the processor (120), cache (125), data storage (130), peripheral device adapters (135), and network adapter (140) may be communicatively coupled via bus (107).

The processor (120) may include the hardware architecture for retrieving executable code from the data storage (130) and executing the executable code. The executable code may, when executed by the processor (120), cause the processor (120) to implement at least the functionality of sorting data within a database such as database (110), data storage (130), or external database (145) in order to present the data in a sorted manner that is intelligible to a user according to the methods of the present specification described below. In the course of executing code, the processor (120) may receive input from and provide output to one or more of the remaining hardware units.

In one example, the computing device (105), and, specifically, the processor (120) accesses data within the database (110), sorts the data, and presents the data to a user via an output device (150). The processor (120), in one example, presents to the user with a user interface on the output device (150). The output device (150) may be any number of devices that provide a representation of, for example, the sorted data or user interfaces to a user. In one example, the output device (150) is a display device such as a cathode ray tube, a plasma display, or a liquid crystal display, among others.

The data storage (130) may store data that is processed and produced by the processor (120). As discussed above and in more detail below, the data storage (130) may also specifically save data including, for example, unsorted data, sorted data, records, or combinations of these. All of this data may further be stored in the form of a sorted database for easy retrieval. The data storage (130) may include various types of memory modules, including volatile and nonvolatile memory. For example, the data storage (130) of the present example includes random access memory (RAM) (132), read only memory (ROM) (134), and a hard disk drive (HDD) (136) memory. Many other types of memory may be employed, and the present specification contemplates the use of many varying type(s) of memory in the data storage (130) as may suit a particular application of the principles described herein. In certain examples, different types of memory in the data storage (130) may be used for different data storage needs. For example, in certain examples the processor (120) may boot from ROM (134), maintain nonvolatile storage in the HDD (136) memory, and execute program code stored in RAM (132).

Generally, the data storage (130) may comprise a computer readable storage medium. For example, the data storage (130) may be, but not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, the processor (120). In another example, a computer readable storage medium may be any form of non-transitory medium.

The peripheral device adapters (135) and network adapter (140) in the computing device (105) enable the processor (120) to interface with various other hardware elements, external and internal to the computing device (105). For example, peripheral device adapters (135) may provide an interface to input/output devices, such as, for example, output device (150), to create a user interface and/or access external sources of memory storage, such as, for example, external data storage (145). As addressed above and discussed below, an output device (150) may be provided to allow a user to interact with computing device (105) in order to sort data or records received from a data source.

Peripheral device adapters (135) may also create an interface between the processor (120) and a printer (155) or other media output device. For example, where the computing device (105) sorts data or records, and the user then wishes to then print the sorted data or records, the computing device (105) may instruct the printer (155) to create one or more physical copies of the sorted data or records. A network adapter (140) may additionally provide an interface to the network (115), thereby enabling the transmission of data or records to and receipt of the data or records from other devices on the network (115), including the database (110). In one example, the network (115) may comprise two or more computing devices communicatively coupled. For example, the network (115) may include a local area network (LAN), a wide area network (WAN), a virtual private network (VPN), and the Internet, among others.

Figure 2:
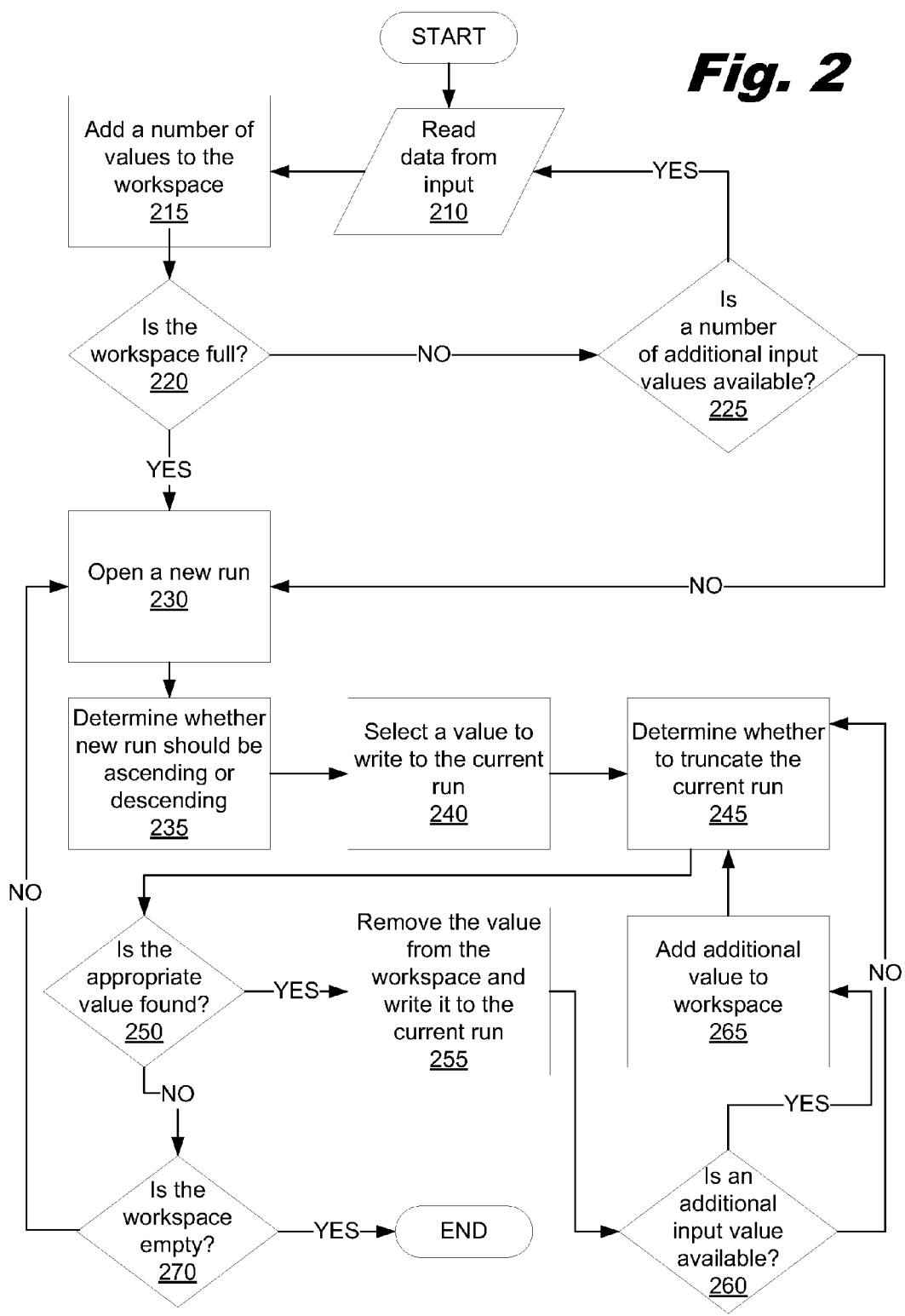
FIG. 2 is a flowchart showing an illustrative run generation method that exploits incidental sort order of data during run generation, according to one example of the principles described herein.

FIG. 2 is a flowchart showing an illustrative run generation method that exploits incidental sort order of data, according to one example of the principles described herein. This method utilizes reversal of run order and truncation of runs to achieve a sorted list in relatively less time and cost in computing power and computing resources. Before discussing the sorting method of FIG. 2, sorting of data will now be discussed generally.

Run generation is a process of reading generally unordered data from an input and forming this data into groups of ordered or sequenced data. These groups of sequenced data may be referred to as runs. Merging is a process of combining the generated runs into larger runs until one run or one set of runs remains. Thus, the generally unordered data read from the input is in the form of a sequenced or ordered body of data after completion of run generation and merging. Generated runs can be used in a number of applications. External merge sort, for example, is comprised of two major actions; namely run generation and merging. Other applications, both database and non-database, can also benefit from this invention. For example, the database task of join processing depends upon run generation and, like sort, can benefit from the merge planning techniques enabled by the various examples of the present specification.

Disk scheduling could leverage the technique of detecting positive and negative correlations between original and desired data sequences to detect when requests are tending to arrive in the opposite direction of the current scan direction, and then reverse the scan direction. For example, if data on a disk is sorted in an ascending order, but requests for data are accessing data in a descending order, then reversing the scan direction can improve scan performance.

The method of run generation will now be described in more detail in conjunction with FIG. 2. Turning back to FIG. 2, the run generation method may begin by the processor (120) reading data from an input (block 210) such as, for example, the database (110), and adding a number of values to a memory such as the cache (125) or the RAM (132) (block 215). The memory becomes a workspace in which the run generation method is executed. In one example, the workspace is RAM (132), and the resultant runs are stored on the HDD (136). In another example, the workspace is cache (125), and the resultant runs are stored in RAM (132). In yet another example, the runs may be stored in other forms of data storage such as, for example, the external data storage (145) which may comprise flash memory devices, or memristor devices, among others. Thus, generally, the data is input into a first memory device, and stored in a second memory device. In still another example, the workspace and the memory device on which the resultant runs are stored are the same memory device. In this example, sorting, run generation, and run storage may all be performed on a single memory device such as, for example, the cache (125), the RAM (132), the HDD (136), or the external data storage (145).

Correlation between the desired sort order (ascending or descending) and the natural order of the keys of the input data can be determined by the processor (120) as the workspace (block 215) is filled with unsorted records. In one example, the processor (120) may perform a (linear) regression calculation to determine whether keys in the input are ascending or descending. The priority queue is then initialized as needed for replacement selection. This technique could be used for every run comprising filling the workspace, regression analysis, and initializing the priority queue, at the expense of draining and filling the priority queue repeatedly rather than keeping the priority queue always full. In this manner, the priority queue is operating at best efficiency.

As will be discussed in more detail below, the generation of runs can switch direction from ascending to descending for each run, with an average run length of 1.5 times the workspace size for random (uniformly distributed) input data. Generation of runs can switch from ascending to descending (and visa versa) after any integer number k (k=1, 2, 3, 4, . . . ) of runs such that the average run length is relatively longer. The dynamic switching from ascending to descending (and visa versa) of runs provides for a method that takes advantage of data that happens to be sorted or partially sorted in a manner related to the desired output sort order. Thus, dynamic switching from ascending to descending (and visa versa) of runs decreases time and cost, for example, in computing power and resources. This is especially the case during subsequent merging of the runs.

Turning back to FIG. 2, after the data is input and added to the workspace (blocks 210 and 215), it is determined if the workspace is full (block 220). If the workspace is not full (block 220, Determination NO), then it is determined if a number of additional input values are available (block 225). If there are additional input values available (block 225, Determination YES), then those values are input and added to the workspace (blocks 210 and 215). If, however, the workspace is full (block 220, Determination YES), then a new run is opened (block 230). Similarly, if there are no additional input values available (block 225, Determination NO), then a new run is opened (block 230).

After the new run is opened (block 230), the processor (120) determines whether the new run should be generated in an ascending or descending order (block 235). Several factors may be used in determining whether to sort data within the next run in ascending or descending sort order. In one example, the run order may be automatically reversed every k runs, as discussed above. This automatic reversal of runs may be performed regardless of run sizes or observations of values that have been input into the workspace by the processor (120). In this and other examples, k can be determined by any number of methods.

In one example, k may be determined based on trends of values that have been added to the workspace thus far. In this example, suppose that the values that have been added to the workspace so far are, for example, generally following some pattern of generally increasing, then decreasing for some large number of records (for example, if the values represent the increasing and decreasing sales numbers for some seasonal item, such as candy or swimming suits, over a period of some years), and that the last hundred records reflect a sales peak that has been reached, followed by diminishing sales. In this example, and based on this information, it may be advantageous to choose to order the next run in descending order. In another example, if, for some reason, the values that have been added to the workspace are, for example, values or groups of values that alternate at opposite ends of a series or domain, then the processor (120) may anticipate this alternation and switch between ascending and descending order and visa versa.

In yet another example, k may be determined based on whether the previous run was sorted in ascending or descending order. For example, for a run k that was sorted in ascending order, run k+1 may be sorted in descending order. This alternating pattern of ascending and descending sort orders may be applied at any interval. For example, instead of alternating from one direction to another for every new run, the sort order of the runs may be switched from ascending to descending (or visa versa) every n number of runs, where n is an integer number of runs. The present method and system has several advantages. For example, at the point in time when run n is completed, the in-memory workspace is fully primed and prepared to produce run n+1 in the same direction as run n. Reversing the run direction for run n+1 cannot take full advantage of this preparation. However, no work has been expended yet on run n+2. Thus, if the decision is made to reverse run directions, the workspace can be prepared for a reversal in run n+2 without any loss of efficiency.

In still another example, k may be determined based on the values that have been recently added to the workspace. In this example, the processor (120) considers the values that have been recently added to the workspace, and, if those values are, for example, among the last values in the known domain even though only a small fraction of the data set has been processed, then the processor (120) determines that the new run should be sorted in a descending order. Thus, the determination of whether the new run should be ascending or descending (block 235) can be performed by the processor after a new run has been opened.

After the processor (120) determines whether the new run should be ascending or descending (block 235), a value among the values within the workspace is selected, and written to the new run (block 240). If, for example, the processor (120) has just initialized a new run, in which it was determined that the values should be sorted in ascending order, then the processor (120) will choose the lowest value in the workspace, and write that value to the run (block 240). As in standard replacement selection, this value now becomes the threshold for selecting the next value to write to the run, at which point that new value will become the next threshold, and so on.

After one or more values have been written to the new run (block 240), the processor (120) may determine whether to truncate the current run. Truncating a current run provides for a simplified merging process of the generated runs by providing runs that cover distinct ranges, which maybe easier to merge together, or possibly appended while avoiding merging. Truncation of a run may also prepare the way for virtual concatenation; a process that avoids merge steps altogether. In virtual concatenation, if the values in two or more runs have non-overlapping key ranges, these runs may be combined into a single run. Rather than concatenating files by moving pages on-disk, the processor (120) may declare all these files as a single "virtual" run and scan all files that make up a virtual run when merging runs.

Upon detecting a significant change in the distribution of values read from the input, the processor (120) may determine whether to truncate the current run instead of extending the range of values contained in that range (block 245). For example, if all or close to all the remaining input values in the workspace are clustered at one end of the series or domain of values, and it is determined that the next value would be at the opposite end of the series or domain of values, the processor (120) may decide to truncate the current run and open a new run, possibly reversing the sort order of the new run. Thus, the processor (120) determines whether to truncate a current run (block 245) while still working on the current run.

After the processor (120) determines whether to truncate the current run (block 245), the processor (120) determines if an appropriate value is found in the workspace (block 250). If an appropriate value is not found in the workspace (block 250, Determination NO), then the processor (120) determines if the workspace is empty (block 270). If the workspace is empty (block 270, Determination YES), then the sorting process terminates. However, if the processor (120) determines that the workspace is not empty (block 270, Determination NO), then the method loops back to block 230 and a new run is opened.

If, at block 250, an appropriate value for the run within the workspace is found (block 250, Determination YES), then the processor (120) removes the appropriate value from the workspace and writes the value to the current run (block 255). The processor (120) then determines if an additional input value is available for input from the database (110) to the workspace (block 260). If there is an additional input value available (block 260, Determination YES), then the processor (120) adds the additional value to the workspace (block 265). If there is not an additional input value available (block 260, Determination NO), then the method loops back to step 245, and the processor (120) again determines whether to truncate the current run (block 245).

The methods described above can be accomplished by a computer program product comprising a computer readable storage medium having computer usable program code stored thereon that, when executed, performs the above methods. Specifically, the computer usable program code, when executed by the processor (120), causes the processor (120) to determine whether data values within a first storage device (125) should be sorted in a run in an ascending or descending order and truncate the run based on the distribution of data values input to the first storage device (125).

The specification and figures describe a system and method for exploiting an incidental sort order of data during run generation. This exploitation of an incidental sort order of data during run generation may have a number of advantages, including: (1) if the data within the database are sorted in any way related to the desired output sort order, the present dynamic and adaptive method will exploit these related sort orders, and (2) the time and cost, for example, in computing power and resources, is reduced by exploiting any correlation between the sort order of the input r data and the desired sort order.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer executed method of exploiting correlations between original and desired data sequences during run generation comprising:
   with a processor:
   adding a number of data values from a data source to a first memory device, the first memory device defining a workspace;
   determining whether to output the data values within the workspace in ascending or descending order for a number of runs; and
   writing a number of the data values as a run to a second memory device in the determined order;
   in which determining whether to output the data values within the workspace in ascending or descending order for a number of runs comprises switching the order every k number of runs, in which k is a positive integer.

2. A computer executed method of exploiting correlations between original and desired data sequences during run generation comprising:
   with a processor:
   adding a number of data values from a data source to a first memory device, the first memory device defining a workspace;
   determining whether to output the data values within the workspace in ascending or descending order for a number of runs; and
   writing a number of the data values as a run to a second memory device in the determined order; and
   determining whether or not to truncate each run based on the distribution of data values read from the data source;
   in which truncating the run based on the distribution of data values read from the database comprises determining if the data values contained in the workspace lie at the opposite end of a series of data values within the data source as compared to the data values previously emitted to the current run.

3. A system for exploiting an incidental sort order of data during run generation comprising:
   a first memory device, the first memory device defining a workspace;
   a second memory device that stores generated runs; and
   a processor that:
      retrieves data values from a data source communicatively coupled to the system and adds the data values to the workspace;
      determines whether the data values within the workspace are to be sorted in ascending or descending order; and
      writes a number of the data values as a run to the second memory device in the determined order, in which determining whether the data values within the workspace are to be sorted in ascending or descending order comprises switching the order every k number of runs, in which k is a positive integer.

4. The method of claim 1, further comprising determining whether or not to truncate each run based on the distribution of data values read from the data source.

5. The method of claim 1, in which determining whether the data values within the workspace are to be added to a run in ascending or descending order comprises switching the order based on analysis of data values already added to the workspace.

6. The method of claim 1, in which determining whether the data values within the workspace are to be added to a run in ascending or descending order comprises switching the order based on the order in which values were added to a previous run.

7. The method of claim 1, in which determining whether the data values within the workspace are to be added to a run in ascending or descending order comprises switching the order based on the analysis of data values remaining to be added to the workspace.

8. The method of claim 1, further comprising:
   scanning a number of data values from a disk in response to a number of requests for data values;
   determining whether the order in which data values are being requested correlate to the order in which data values are being scanned from the disk; and
   determining whether to reverse the order of the disk scan based on the distribution of data values being requested.

9. The method of claim 2, in which, if the run is truncated, then opening a new run and switching the sort order of the new run relative to the previous run.

10. The method of claim 1, in which a number of runs are generated, and in which the number of runs are merged into a one ordered run.

11. The method of claim 1, in which a number of runs are generated, and in which the number of runs are used to implement a database join operation.

12. The system of claim 3, in which the processor further truncates the run based on the distribution of data values read from the data source.

13. The system of claim 3, further comprising an output device that outputs a representation of sorted data values to a user.

14. The system of claim 3, in which the processor further determines whether or not to truncate each run based on the distribution of data values read from the data source,
   in which, if the data values contained in the workspace lie at the opposite end of a series of data values within the data source as compared to the data values previously emitted to the run, the processor truncates the run and opens a new run.

15. The method of claim 8, in which the order of the disk scan is reversed if the data values on the disk are sorted in a first order and the requests for data are accessing data on the disk in an opposite order.

16. The system of claim 14, in which, if the run is truncated, then, with the processor, opening a new run and switching the sort order of the new run relative to the previous run.

* * * * *